US009487182B2

(12) United States Patent
Katsuta

(10) Patent No.: US 9,487,182 B2
(45) Date of Patent: Nov. 8, 2016

(54) GAS GENERATOR FOR RESTRAINING DEVICE

(71) Applicant: DAICEL CORPORATION, Osaka-shi, Osaka (JP)

(72) Inventor: Takashi Katsuta, Tatsuno (JP)

(73) Assignee: DAICEL CORPORATION, Osaka (JP)

(*) Notice: Subject to any disclaimer, the term of this patent is extended or adjusted under 35 U.S.C. 154(b) by 0 days.

(21) Appl. No.: 14/894,411

(22) PCT Filed: Jun. 3, 2014

(86) PCT No.: PCT/JP2014/064702
§ 371 (c)(1),
(2) Date: Nov. 27, 2015

(87) PCT Pub. No.: WO2014/203723
PCT Pub. Date: Dec. 24, 2014

(65) Prior Publication Data
US 2016/0121841 A1 May 5, 2016

(30) Foreign Application Priority Data

Jun. 21, 2013 (JP) ................................. 2013-130727

(51) Int. Cl.
C06D 5/00 (2006.01)
B60R 21/264 (2006.01)
B60R 21/26 (2011.01)

(52) U.S. Cl.
CPC ......... B60R 21/264 (2013.01); B60R 21/2644 (2013.01); B60R 2021/26011 (2013.01); B60R 2021/2642 (2013.01); B60R 2021/2648 (2013.01)

(58) Field of Classification Search
CPC ............ B60R 21/264; B60R 21/2644; B60R 2021/26011; B60R 2021/2648; B60R 2021/2642
USPC ........................................................ 102/530
See application file for complete search history.

(56) References Cited

U.S. PATENT DOCUMENTS 5,009,855 A 4/1991 Nilsson
5,628,528 A 5/1997 DeSautelle et al.
(Continued)

FOREIGN PATENT DOCUMENTS

JP 2000-26189 A 1/2000
JP 2002-360607 A 12/2002
(Continued)

OTHER PUBLICATIONS

International Search Report issued in PCT/JP2014/064702, dated Aug. 5, 2014.
(Continued)

Primary Examiner — Michelle R Clement
(74) Attorney, Agent, or Firm — Birch, Stewart, Kolasch & Birch, LLP

(57) ABSTRACT

The present invention provides a gas generator for a restraining device, including:
a housing;
an ignition device chamber housing and an outer cylindrical wall portion disposed inside the housing; and
an annular partition wall portion forming a space near a top plate between the ignition device chamber housing and the outer cylindrical wall portion,
a portion defined by the top plate and a bottom plate of the housing, the ignition device chamber housing and the outer cylindrical wall portion is a combustion chamber charged with a gas generating agent;
an inner cylindrical wall portion, disposed on the housing bottom plate and spaced from the annular partition wall portion, is provided inside the combustion chamber;
the ignition device chamber and the combustion chamber communicate with each other by a first communication portion;
the combustion chamber and the space communicate with each other by a gas-flow hole of the annular partition wall portion;
the first communication portion and the inner cylindrical wall portion face each other in the radial direction of the housing; and
a combustion product generated in the ignition device chamber passes through the first communication portion, then collides with the inner cylindrical wall portion, changes a flow direction toward the top plate, and passes through the gas-flow hole of the annular partition wall portion.

11 Claims, 4 Drawing Sheets

(56) References Cited

U.S. PATENT DOCUMENTS

| | | | | |
|---|---|---|---|---|
| 6,227,565 B1* | 5/2001 | McFarland | ......... | B60R 21/2644 102/531 |
| 6,562,161 B1 | 5/2003 | Yamato et al. | | |
| 9,353,703 B2* | 5/2016 | Kobayashi | ................ | F42B 3/04 |
| 2004/0046373 A1 | 3/2004 | Wang et al. | | |
| 2004/0124618 A1* | 7/2004 | Schonhuber | ........ | B60R 21/2644 280/736 |
| 2005/0001414 A1* | 1/2005 | Matsuda | ............. | B60R 21/2644 280/736 |
| 2005/0151356 A1 | 7/2005 | Ohji et al. | | |
| 2006/0119086 A1* | 6/2006 | Blessing | ............. | B60R 21/2644 280/736 |
| 2006/0151977 A1* | 7/2006 | Yamazaki | .......... | B60R 21/2644 280/736 |
| 2007/0222195 A1* | 9/2007 | Yabuta | ...................... | F42B 3/04 280/740 |
| 2010/0117344 A1* | 5/2010 | Windhausen | ......... | B60R 21/261 280/737 |
| 2010/0320735 A1* | 12/2010 | Duvacquier | ........ | B60R 21/2644 280/741 |
| 2011/0193330 A1* | 8/2011 | Kobayashi | .......... | B60R 21/2644 280/741 |
| 2011/0221175 A1* | 9/2011 | Kobayashi | .......... | B60R 21/2644 280/741 |
| 2011/0253000 A1* | 10/2011 | Kobayashi | .......... | B60R 21/2644 102/531 |
| 2011/0259234 A1* | 10/2011 | Kobayashi | .......... | B60R 21/2644 102/530 |
| 2012/0090493 A1* | 4/2012 | Fukuyama | .......... | B60R 21/2644 102/530 |
| 2013/0233196 A1* | 9/2013 | Kobayashi | .......... | B60R 21/2644 102/530 |
| 2013/0239839 A1* | 9/2013 | Yamazaki | ........... | B60R 21/2644 102/530 |
| 2013/0255529 A1* | 10/2013 | Kobayashi | .......... | B60R 21/2644 102/530 |
| 2013/0312632 A1* | 11/2013 | Ukita | ....................... | C06D 5/00 102/530 |
| 2014/0123869 A1* | 5/2014 | Ukita | .................... | B60R 21/264 102/530 |
| 2015/0225308 A1* | 8/2015 | Fujisaki | ........... | B60R 21/2644 280/740 |
| 2016/0121841 A1* | 5/2016 | Katsuta | ............... | B60R 21/2644 102/530 |

FOREIGN PATENT DOCUMENTS

| | | |
|---|---|---|
| JP | 2003-191816 A | 7/2003 |
| JP | 2008-183939 A | 8/2008 |
| JP | 2010-163025 A | 7/2010 |
| JP | 2010-163044 A | 7/2010 |
| JP | 2012-61960 A | 3/2012 |

OTHER PUBLICATIONS

Written Opinion of the International Searching Authority, dated Aug. 5, 2014.

* cited by examiner

GAS GENERATOR FOR RESTRAINING DEVICE

TECHNICAL FIELD

The present invention relates to a gas generator for a restraining device such as an airbag apparatus.

DESCRIPTION OF RELATED ART

A gas generator using a gas generating agent is known in which ignition and combustion ability of the gas generating agent charged into a combustion chamber are improved by adjusting the position of an ignition start portion in the combustion chamber and the outlet for discharging combustion gas from the combustion chamber.

In the gas generator disclosed in JP-A No. 2010-163025, the gas generating agent 41 in combustion chamber 40 is ignited from a portion facing the ventilating portion 27 near the bottom plate 13a of the closure shell, the combustion gas is discharged from the porous member 50 which is an outlet of the combustion chamber 40. Therefore, the gas flows from the axially lower side to the upper side in the combustion chamber 40.

Since high-temperature combustion gas is generated from the gas generating agent ignited in the vicinity of the ventilating portion 27 and this high-temperature combustion gas flows axially upward (toward the space 60), the gas generating agent close to the porous member 50, which is in the unburned state at the initial stage of actuation, is also easily burned, and ignition performance of the entire gas generating agent inside the combustion chamber 40 is improved.

In the gas generator disclosed in U.S. Pat. No. 5,628,528, the propellant chamber is separated into two chambers 62, 64 by the barrier 60. At the time of actuation, the propellant 40 in the propellant chamber 62 is directly burned by the igniter 24, but because of the barrier 60, flame from the igniter 24 does not reach a propellant 66 in the propellant chamber 64. The propellant 66 in the propellant chamber 64 is ignited by heat conduction from the propellant 40.

U.S. Pat. No. 5,009,855 discloses three gas generators depicted in FIG. 1 to FIG. 3. In FIG. 1, the insert 9 is arranged in the combustion chamber 3. In FIG. 2, the insert 18 having the ball portion 20 is arranged inside the combustion chamber. In FIG. 3, the insert 29 is arranged in the combustion chamber. The combustion chamber is divided by the insert into the large chamber and the small chamber, and the gas generating agent is charged into each chamber. Upon actuation, the gas generating agent in the small chamber is initially burned, the gas generated thereby is supplied to the large chamber, and the gas generating agent therein is burned.

It is known that when an airbag is inflated by the combustion gas released from the gas generator, from the standpoint of effect on an occupant regarding an airbag deployment and protection of the occupant, it is desirable that the gas be discharged (pressure be increased) such that an S-shaped output curve (an S-curve) be obtained, where the abscissa of a graph is a time (ms) and the ordinate is a pressure (see, for example, FIG. 1 of JP-A No. 2000-026189, and FIG. 4 of JP-A No. 2003-191816).

SUMMARY OF INVENTION

The present invention provides a gas generator for a restraining device, including:

a gas generator for a restraining device, comprising:

a housing including a top plate, a circumferential wall provided with a gas discharge port and a bottom plate;

a tubular ignition device chamber housing being disposed inside the housing to form an ignition device chamber, that accommodates an ignition device, and having one end opening closed;

an outer cylindrical wall portion being disposed such that a gas discharge path in communication with the gas discharge port is formed between the circumferential wall and the outer cylindrical wall portion;

an annular partition wall portion having a gas-flow hole and being disposed between the ignition device chamber housing and the outer cylindrical wall portion to form a space with the top plate;

a combustion chamber enclosed by the top plate, the bottom plate, the ignition device chamber housing, and the outer cylindrical wall portion and being charged with a gas generating agent therein;

an inner cylindrical wall portion arranged on the bottom plate and spaced from the ignition device chamber housing and the outer cylindrical wall portion, and also at a distance from the annular partition wall portion;

the ignition device chamber and the combustion chamber communicating with each other by a first communication portion formed by an opening provided in a circumferential wall portion of the ignition device chamber housing on the bottom plate side;

the combustion chamber and the space formed by the annular partition wall portion communicating with each other by the gas-flow hole of the annular partition wall portion;

the space formed by the annular partition wall portion and the gas discharge path which communicates with the gas discharge port, communicating with each other by a second communication portion formed by an opening provided between the outer cylindrical wall portion and the top plate;

the first communication portion and the inner cylindrical wall portion facing each other in a radial direction of the housing; and a combustion product, which is generated in the ignition device chamber, passing through the first communication portion, then colliding with the inner cylindrical wall portion, changing a flow direction toward the top plate where the second communication portion is provided, and passing through the gas-flow hole of the annular partition wall portion.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF INVENTION

In the gas generator disclosed in JP-A No. 2010-163025, the ignition and combustion ability of the gas generating agent inside the combustion chamber is improved, but since the invention of JP-A No. 2010-163025 is to improve the ignition ability such as to burn the gas generating agent in the combustion chamber at once, discharging the combustion gas so as to provide the S-shaped output curve such as described hereinabove goes against the invention of JP-A No. 2010-163025.

In U.S. Pat. No. 5,628,528, the combustion chamber is separated into two chambers, and the transmission of heat from one propellant chamber causes ignition and combustion of the propellant in the other propellant chamber. In view of this, it is considered that the transmission of heat is influenced by the ambient temperature and the combustion gas is difficult to be discharged such as to provide the above-mentioned S-shaped output curve.

Figure 1:
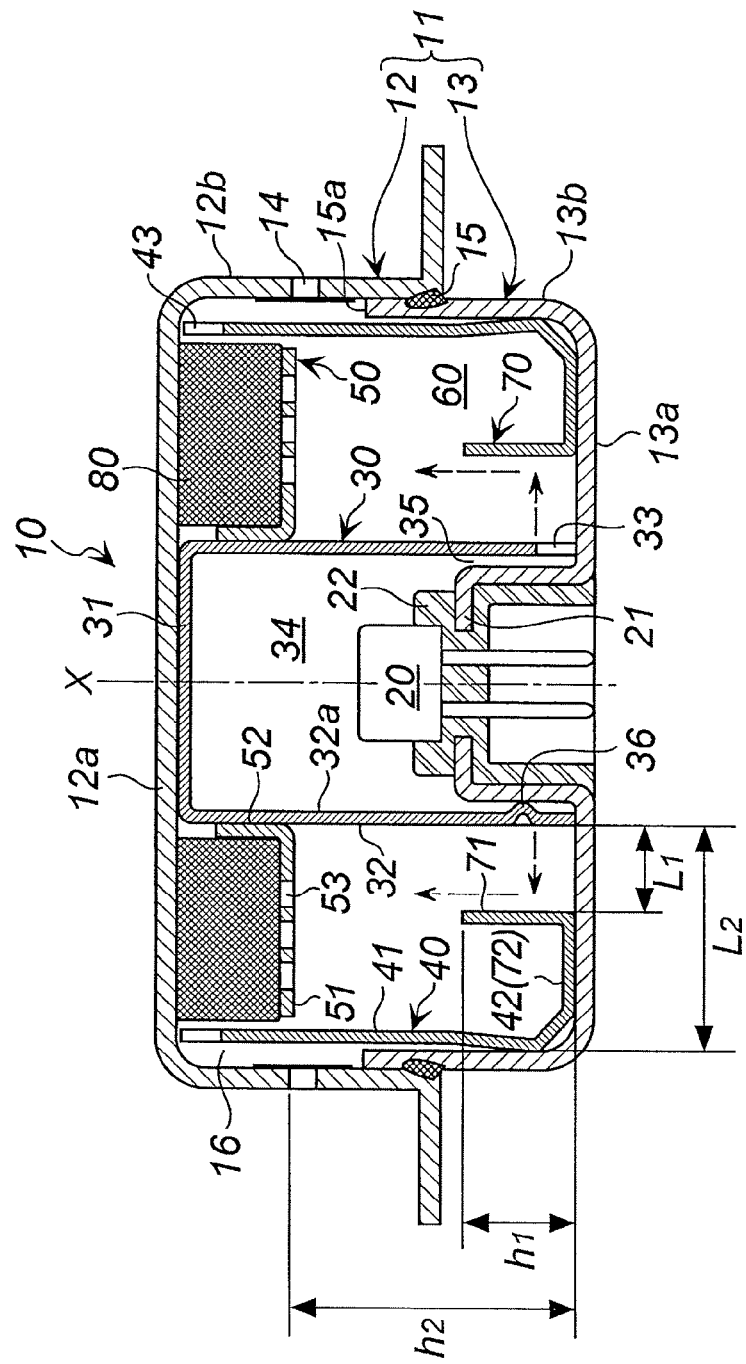
FIG. 1 shows a cross-sectional view in the X-axis direction of the housing of the gas generator in accordance with the present invention.

In the gas generator depicted in FIG. 1 of U.S. Pat. No. 5,009,855, in view of the arrangement state of the ignition opening 8, the insert 9 and the gas discharge opening 15, the ignition ability of the entire gas generating agent inside the combustion chamber is too good and the inherent effects are difficult to obtain.

Figure 2:
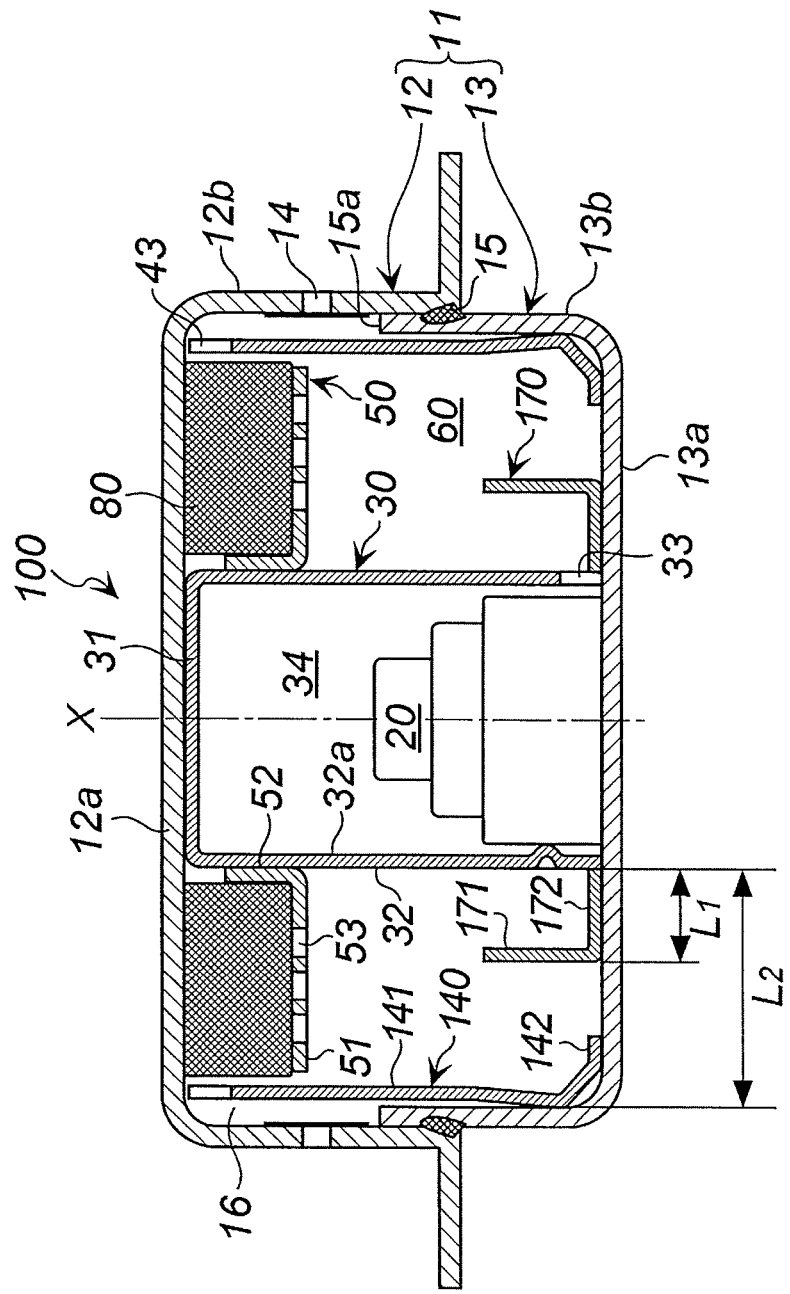
FIG. 2 shows a cross-sectional view in the X-axis direction of the housing of the gas generator which is another embodiment of the present invention.

Further, in the gas generator depicted in FIG. 2, the combustion gas from a smaller-amount portion of gas generating agent 21 causes ignition of a larger-amount portion of gas generating agent 22 through an opening 23, and the inherent effects are difficult to obtain for the same reason as indicated in relation to FIG. 1. The same is also true with respect to the gas generator depicted in FIG. 3.

Therefore, in the gas generators depicted in FIGS. 1 to 3, the combustion gas is hardly discharged to provide the S-shaped output curve such as described hereinabove.

The present invention is to provide a gas generator suitable for a restraining device such as an airbag apparatus, the gas generator using a single ignition device and making a difference in ignition start timings of the gas generating agent charged in the combustion chamber.

In the gas generator in accordance with the present invention, the inner cylindrical wall portion is arranged inside the combustion chamber accommodating the gas generating agent, thereby providing, in the combustion chamber, a space (referred to hereinbelow as "a space for initial ignition") where the gas generating agent is ignited and burned relatively earlier and a space (referred to hereinbelow as "a space for late ignition") where the gas generating agent is ignited and burned relatively later.

The space for initial ignition is formed radially on the inner side of the inner cylindrical wall portion. The space for late ignition is formed radially on the outer side of the inner cylindrical wall portion.

Further, in the gas generator in accordance with the present invention, the first communication portion, which communicates the ignition device chamber with the combustion chamber, directly faces the inner cylindrical wall portion in the radial direction of the housing.

In accordance with the present invention, the height, from the bottom plate, of the upper end of the opening forming the first communication portion is preferably equal to or less than half of the height (h1) from the bottom plate to the upper end of the inner cylindrical wall portion.

In the gas generator in accordance with the present invention, when the ignition device in the ignition device chamber is actuated and the combustion product (flame, combustion gas, etc.) is released from the first communication portion into the combustion chamber, the combustion product is released in the radial direction of the housing, the gas generating agent charged into the space for initial ignition is ignited and burned at first, and combustion gas is generated.

The combustion product released from the first communication portion causes combustion of the gas generating agent inside the space for initial ignition and then collides with the inner cylindrical wall portion.

Inside the housing, the second communication portion and the gas discharge path communicating with the gas discharge port exist on the top plate side. Therefore, the combustion gas flows together with the combustion product toward the top plate and ignites the unburned gas generating agent present above the space for initial ignition in the X-axis direction (on the top plate side).

The gas generated at this stage passes through the gas-flow hole formed in the annular partition wall portion and flows into the space formed above the combustion chamber. However, the gas generating agent present in the space for late ignition is located at a position opposite to the flow of the combustion gas in the X-axis direction, and the ignition thereof is delayed. A large number of the gas-flow holes can be uniformly formed in the annular partition wall portion, thereby controlling the block of passage of the combustion gas and the ignition of the gas generating agent in the space for late ignition caused by reflection of part of the gas generated in the space for initial ignition.

By so providing, in the combustion chamber, the space for initial ignition and the space for late ignition on the opposite side of the gas outlet in the X-axis direction, it is possible to create a difference in ignition start timings of the gas generating agent charged into the combustion chamber. Therefore, it is possible to discharge the combustion gas such as to provide the abovementioned S-shaped output curve.

In accordance with the present invention, in particular, since the radially inner side, with respect to the inner cylindrical wall portion, is taken as the space for initial ignition and is made to directly communicate with the first communication portion and the space for late ignition is formed on the radially outer side, the above-mentioned advantageous operation effects are easily obtained.

The present invention preferably provides the gas generator for a restraining device, wherein the inner cylindrical wall portion meets at least Requirement (a) among requirements selected from following Requirements (a) to (c); and Requirement (a) is met by that a ratio (h1/h2) of a height (h1) from the bottom plate to the upper end of the inner cylindrical wall portion and a height (h2) from the bottom plate to the annular partition wall portion is within a range of 0.3 to 0.7;

(a) a height range of the inner cylindrical wall portion in the axial direction of the housing from the bottom plate is adjusted;

(b) a distance between the inner cylindrical wall portion and the ignition device chamber housing is adjusted; and (c) an inclination angle of the inner cylindrical wall portion with respect to the bottom plate is adjusted.

Since the inner cylindrical wall portion is arranged inside the combustion chamber, the space for initial ignition and the space for late ignition are formed, a time difference is created between ignition and combustion start timings of the gas generating agent charged into the combustion chamber, and the combustion gas is released such as to provide the abovementioned S-shaped output curve.

In this case, by adjusting Requirement (a) to a predetermined range, it is possible to adjust the difference between the ignition start timing of the gas generating agent charged into the space for initial ignition and the ignition start timing of the gas generating agent charged into the space for late ignition to a more desirable range.

By adjusting, as necessary, Requirements (b) and (c), it is possible to adjust the volumes of the space for initial ignition and the space for late ignition (the charged amount of the gas generating agent).

In accordance with the present invention, it is preferred that Requirement (b) is that a ratio (L1/L2) of a distance (L1) from the ignition device chamber housing to the inner cylindrical wall portion to a distance (L2) from the ignition device chamber housing to the outer cylindrical wall portion is within a range of 0.1 to 0.9, more preferably within a range of 0.3 to 0.7.

Here, L1 is determined by the maximum distance from the outer circumferential surface of the ignition device chamber housing to the outer circumferential surface of the inner cylindrical wall portion, and L2 is determined by the maximum distance from the outer circumferential surface of the ignition device chamber housing to the outer circumferential surface of the outer cylindrical wall portion.

Further, in accordance with the present invention, it is preferred that Requirement (c) be that an angle between the bottom plate and the inner cylindrical wall portion on a side of the ignition device chamber housing is 70° to 140°.

The present invention preferably provides the gas generator for a restraining device, wherein the inner cylindrical wall portion has a cylindrical wall surface and an outer annular flat surface extending outward in the radial direction of the housing from an outer circumferential edge at a lower end of the cylindrical wall surface;

the outer cylindrical wall portion has a cylindrical wall surface and an inner annular flat surface extending inward in the radial direction of the housing from an inner circumferential edge at a lower end of the cylindrical wall surface;

the inner cylindrical wall portion and the outer cylindrical wall portion is formed integrally at the outer annular flat surface and the inner annular flat surface; and an outer circumferential surface of the cylindrical wall surface of the outer cylindrical wall portion is fitted in a state of abutment against a circumferential wall of the housing where the gas discharge port is not formed.

In the case that the inner cylindrical wall portion and the outer cylindrical wall portion are integrated, the two parts can be mounted together. Therefore the mounting operation is facilitated.

Further, above-described Requirements (a), (b) and (c) are easily adjusted by adjusting the height and the angle of the cylindrical wall surface of the inner cylindrical wall portion, and the length of the outer annular flat surface and inner annular flat surface.

The present invention preferably provides the gas generator for a restraining device, wherein the inner cylindrical wall portion has a cylindrical wall surface and an inner annular flat surface extending inward in the radial direction of the housing from an inner circumferential edge at a lower end of the cylindrical wall surface; and an inner circumferential edge of the inner annular flat surface of the inner cylindrical wall portion is fitted in a state of abutment against the ignition device or the ignition device chamber housing.

Since the inner cylindrical wall portion is mounted such as to abut against the ignition device (the metallic collar fixing the igniter) or the ignition device chamber housing, positioning thereof is facilitated.

Further, above-described Requirements (a) and (b) are easily adjusted by adjusting the height of the cylindrical wall surface and the length of the inner annular flat surface of the inner cylindrical wall portion.

The present invention preferably provides the gas generator for a restraining device, wherein the inner cylindrical wall portion has a cylindrical inclined wall surface inclined outward in the radial direction of the housing and an inner annular flat surface extending inward in the radial direction of the housing from an inner circumferential edge at a lower end of the inclined wall surface; and an inner circumferential edge of the inner annular flat surface of the inner cylindrical wall portion is fitted in a state of abutment against the ignition device or the ignition device chamber housing.

Since the inner cylindrical wall portion is mounted such as to abut against the ignition device (the metallic collar fixing the igniter) or the ignition device chamber housing, positioning thereof is facilitated.

Further, above-described Requirements (a) to (c) are easily adjusted by adjusting the height and the angle of the cylindrical wall surface of the inner cylindrical wall portion, and the length of the inner annular flat surface.

The present invention preferably provides the gas generator for a restraining device, wherein the inner cylindrical wall portion has a cylindrical wall surface and an outer annular flat surface extending outward in the radial direction of the housing from an outer circumferential edge at a lower end of the cylindrical wall surface;

a circumferential edge portion at the upper end of the cylindrical wall surface has depression and protrusion in the axial direction of the housing, the depression and protrusion are formed in a plurality of locations in the circumferential direction, and h1 in Requirement (a) is a height from the bottom plate to the depression of the cylindrical wall surface;

the outer cylindrical wall portion has a cylindrical wall surface and an inner annular flat surface extending inward in the radial direction of the housing from an inner circumferential edge of the cylindrical wall surface;

the inner cylindrical wall portion and the outer cylindrical wall portion are formed integrally at the outer annular flat surface and the inner annular flat surface; and an outer circumferential surface of the cylindrical wall surface of the outer cylindrical wall portion is fitted in a state of abutment against a circumferential wall of the housing where the gas discharge port is not formed.

In the case that the inner cylindrical wall portion and the outer cylindrical wall portion are integrated, the two parts is mounted together. Therefore the mounting operation is facilitated.

Further, above-described Requirements (a), (b) and (c) are easily adjusted by adjusting the height and the angle of the cylindrical wall surface of the inner cylindrical wall portion, and the length of the outer annular flat surface and inner annular flat surface.

Requirement (a) mentioned above is finely adjusted by using the inner cylindrical wall portion in which depressions and protrusions are formed at the cylindrical wall surface.

The present invention preferably provides the gas generator for a restraining device, wherein the inner cylindrical wall portion has a cylindrical wall surface and an inner annular flat surface extending inward in the radial direction of the housing from an inner circumferential edge at a lower end of the cylindrical wall surface;

a circumferential edge portion at the upper end of the cylindrical wall surface has depression and protrusion in the axial direction of the housing, and the depression and protrusion are formed in a plurality of locations in the circumferential direction;

h1 in Requirement (a) is a height from the bottom plate to the depression of the cylindrical wall surface;

an inner circumferential edge of the inner annular flat surface of the inner cylindrical wall portion is fitted in a state of abutment against the ignition device or the ignition device chamber housing.

Since the inner cylindrical wall portion is mounted such as to abut against the ignition device (the metallic collar fixing the igniter) or the ignition device chamber housing, positioning thereof is facilitated.

Further, Requirements (a), (b) and (c) mentioned above are easily adjusted by adjusting the height and the angle of the cylindrical wall surface of the inner cylindrical wall portion, and the length of the inner annular flat surface.

Requirement (a) mentioned above is finely adjusted by using the inner cylindrical wall portion in which depressions and protrusions are formed at the cylindrical wall surface.

The present invention preferably provides the gas generator for a restraining device, wherein a plurality of through holes are formed in the circumferential direction in the cylindrical wall surface of the inner cylindrical wall portion; and h1 in Requirement (a) is a height from the bottom plate to a lower end circumferential edge of the through holes.

Requirements (a), (b) and (c) mentioned above are easily adjusted by adjusting the height and the angle of the cylindrical wall surface and the length of the inner annular flat surface of the inner cylindrical wall portion.

Requirement (a) mentioned above is finely adjusted by using the inner cylindrical wall portion in which through holes are formed in the cylindrical wall surface and adjusting the opening diameter, the number, and the shape of the through holes and also the height thereof from the bottom plate of the housing.

The present invention preferably provides the gas generator for a restraining device, wherein an annular filter is disposed in a space between the top plate and the annular partition wall portion having the gas-flow hole.

The filter is a known filter capable of filtering and cooling the combustion gas.

With the gas generator in accordance with the present invention, a difference between ignition start timings of the gas generating agent charged into the combustion chamber is created even when the gas generating agent is ignited and burned with a single igniter. Therefore, the combustion gas is released and the airbag is inflated such as to provide the S-shaped output curve such as described hereinabove.

Embodiments of the Invention (1) Gas Generator Depicted in FIG. 1

In a gas generator 10 shown in FIG. 1, a metallic housing 11 is obtained by welding and fixing a diffuser shell 12 to a closure shell 13 at a contact portion thereof.

The diffuser shell 12 is in a cup-like shape having a top plate 12a and an upper circumferential wall portion 12b provided with a plurality of gas discharge ports 14. The gas discharge ports 14 are closed from the inner side with an aluminum tape for moisture prevention.

The closure shell 13 is in a cup-like shape having a bottom plate 13a and a lower circumferential wall portion 13b.

The circumferential wall of the housing 11 is formed by the upper circumferential wall portion 12b and the lower circumferential wall portion 13b.

As depicted in FIG. 1, in the housing 11, the closure shell 13 is fitted into the diffuser shell 12, and the contact portion of the shells are welded together and fixed (a welded fixed portion 15). An annular step 15a, such as depicted in FIG. 1, is formed at the inner circumferential surface of the welded fixed portion 15.

An igniter 20, which is held by an igniter collar 21 and a resin 22, is disposed in the central portion of the bottom plate 13a of the closure shell 13. The igniter collar 21 is integrated with the bottom plate 13a, but may be a separate member welded to and integrated with the bottom plate.

A tubular ignition device chamber housing 30 is disposed in the central portion of the housing 11 so as to cover the igniter 20 and the igniter collar 21.

The interior of the ignition device chamber housing 30 corresponds to an ignition device chamber 34, accommodating therein a single igniter 20 and a transfer charge or a gas generating agent (not depicted in the drawing), which configure an ignition device.

The tubular ignition device chamber housing 30 has a closing surface 31 on the top plate 12a side.

The closing surface 31 is obtained by closing the opening of the housing 30 on the top plate 12a side with a separate member, or by closing the opening on the top plate 12a side by making the housing 30 abut against the top plate 12a. Alternatively, a cup-shaped housing may be used.

An inner circumferential surface 32a of a circumferential wall 32 of the tubular ignition device chamber housing 30 is in contact with the igniter collar 21, except for part thereof (a non-contact portion).

In order to increase the fixing strength of the ignition device chamber housing 30 with respect to the igniter collar 21, the inner circumferential surface 32a of the circumferential wall 32 and the igniter collar 21 may be fixed by a protrusion 36 protruding inward from the circumferential wall 32 to press against the igniter collar 21 as depicted in FIG. 1.

A passage 35 for combustion products, which is a gap formed in the X-axis direction, is obtained in the non-contact portion of the inner circumferential surface 32a of the circumferential wall 32 and the igniter collar 21.

In the ignition device chamber housing 30, a first communication portion 33 is formed in part of the circumferential wall 32 on the bottom plate 13a side. The first communication portion 33 is open and is not closed with a closing member such as a seal tape.

The first communication portion 33 is a recess (a portion obtained by cutting out a circumferential edge) in the X-axis direction or a through-hole in the thickness direction, provided on the opening side of the circumferential wall 32.

The first communication portion 33 communicates with the ignition device chamber 34 through the passage 35 for combustion products.

An outer cylindrical wall portion 40 has a cylindrical wall surface 41 and an inner annular flat surface 42 that extends inward in the radial direction of the housing from the inner circumferential edge at the lower end (on the bottom plate 13a side) of the cylindrical wall surface 41.

In the outer cylindrical wall portion 40, the inner annular flat surface 42 is in contact with the bottom plate 13a, and part of the cylindrical wall surface 41 abuts against the lower circumferential wall portion 13b of the closure shell 13.

Since the annular step 15a is present, a cylindrical gas discharge path 16 communicating with the gas discharge port 14 is formed between the cylindrical wall surface 41 and the upper circumferential wall portion 12b of the diffuser shell 12.

The outer cylindrical wall portion 40 has a second communication portion 43 formed by a cut-out portion obtained by partially cutting out the cylindrical wall surface 41 on the top plate 12a side, or opening.

An annular partition wall portion 50 is arranged between the ignition device chamber housing 30 and the outer cylindrical wall portion 40 so that a space is formed between the top plate 12a and the annular partition wall portion.

The annular partition wall portion 50 has an annular flat plate portion 51 having a plurality of gas-flow holes 53 and an annular wall 52 extending in the X-axis direction from the inner circumferential edge of the annular flat plate portion 51. The annular partition wall portion 50 is mounted by press-fitting the annular wall 52 to the ignition device chamber housing 30. The gas-flow holes 53 are formed uniformly over the entire annular flat plate portion 51 and have an opening area such as not to hinder the passage of the combustion gas from the gas generating agent.

An annular filter 80 is disposed in the annular space formed between the top plate 12a and the annular partition wall portion 50. The annular filter 80 is a known filter that filters and cools the combustion gas generated by the gas generating agent.

The space formed by the annular partition wall portion 50 (the space where the annular filter 80 is arranged) and the gas discharge path 16 communicate with each other through the second communication portion 43.

The space surrounded by the annular partition wall portion 50, the bottom plate 13a, the ignition device chamber housing 30 and the outer cylindrical wall portion 40 serves as a combustion chamber 60, and the combustion chamber 60 is filled with a known gas generating agent which is not depicted in the drawing.

The combustion chamber 60 and the space formed by the annular partition wall portion 50 communicate with each other through the gas-flow holes 53 of the annular partition wall portion 50.

An inner cylindrical wall portion 70 is further arranged inside the combustion chamber 60.

The inner cylindrical wall portion 70 has a cylindrical wall surface 71 and an outer annular flat surface 72 that extends outward in the radial direction of the housing from the outer circumferential edge at the lower end (on the bottom plate 13a side) of the cylindrical wall surface 71. The inner cylindrical wall portion 70 is disposed such that the outer annular flat surface 72 is placed on the bottom plate 13a.

In FIG. 1, in the outer cylindrical wall portion 40 and the inner cylindrical wall portion 70, the inner annular flat surface 42 and the outer annular flat surface 72 are unified, but they may be separate surfaces.

The cylindrical wall surface 71 is arranged with a space apart from the ignition device chamber housing 30 and the outer cylindrical wall portion 40 and also with a space apart from the annular partition wall portion 50.

The inner cylindrical wall portion 70 meets at least Requirement (a) among requirements selected from following Requirements (a) to (c).

<Requirement (a)>

The height range of the inner cylindrical wall portion 70 in the axial direction of the housing from the bottom plate 13a is adjusted.

According to Requirement (a), a ratio (h1/h2) of the height (h1) from the bottom plate 13a to the upper end of the inner cylindrical wall portion 70 to the height (h2) from the bottom plate 13a to the annular partition wall portion 50 is within a range of 0.3 to 0.7.

In the gas generator 10 depicted in FIG. 1, h1/h2=0.4.

<Requirement (b)>

(b) The distance between the inner cylindrical wall portion 70 and the ignition device chamber housing 30 is adjusted.

According to Requirement (b), a ratio (L1/L2) of the distance (L1) from the ignition device chamber housing 30 to the inner cylindrical wall portion 70 to the distance (L2) from the ignition device chamber housing 30 to the outer cylindrical wall portion 40 is preferably within a range of 0.3 to 0.7.

In the gas generator 10 depicted in FIG. 1, L1/L2=0.5.

<Requirement (c)>

The inclination angle of the inner cylindrical wall portion 70 with respect to the bottom plate 13a is adjusted.

According to Requirement (c), the angle between the bottom plate 13a and the inner cylindrical wall portion 70 on the side of the ignition device chamber housing 30 is within a range of 70° to 140°.

In the gas generator 10 depicted in FIG. 1, this angle is 90°.

The inner cylindrical wall portion 70 (the cylindrical wall surface 71) and the first communication portion 33 face each other in the radial direction of the housing.

The height of the upper end of the opening serving as the first communication portion 33 from the bottom plate 13a is preferably equal to or less than half of the height (h1) from the bottom plate 13a to the upper end of the inner cylindrical wall portion 70 (the cylindrical wall surface 71).

The operation of the gas generator 10 depicted in FIG. 1, when the gas generator 10 is assembled in a known airbag apparatus for an automobile, will be explained hereinbelow.

Where the igniter 20 located inside the ignition device chamber 34 is actuated, the transfer charge or the gas generating agent is ignited and burned, and a combustion product (flame, combustion gas, etc.) is generated.

When the generated combustion product is released from the first communication portion 33 into the combustion chamber 60, the gas generating agent loaded into a space for initial ignition between the ignition device chamber housing 30 and the inner cylindrical wall portion 70 is ignited and burned.

The space for the initial ignition, as referred to herein, is an annular space defined by the bottom plate 13a of the closure shell, the cylindrical wall surface 71 of the inner cylindrical wall portion and the circumferential wall 32 of the tubular ignition device chamber housing.

The combustion products advance radially outward from the first communication portion 33 toward the interior of the combustion chamber 60 and collide with the inner cylindrical wall portion 70 (the cylindrical wall surface 71) facing the first communication portion 33. As a result, the flow direction thereof changes to the axial direction (the direction toward the top plate 12a, that is, toward the space where the filter 80 is arranged).

At this time, the gas generating agent present in the space for the initial ignition (the space on the inner side of the cylindrical wall surface 71) is burned, and the combustion gas generated therefrom flows toward the top plate 12*a*. Therefore, the unburned gas generating agent present in this direction is also ignited.

However, the gas generating agent charged into a space for late ignition (a space defined by the bottom plate 13*a*, the cylindrical wall surface 71 of the inner cylindrical wall portion and the cylindrical wall surface 41 of the outer cylindrical wall portion) is not present in the flow direction of the combustion gas and is unlikely to be ignited.

Therefore, a gas generating agent which is easy to be ignited and a gas generating agent which is not easy to be ignited are present in the same space.

In other words, the gas generating agent in the space for the initial ignition is ignited and burned to generate combustion gas and the combustion gas is discharged from the gas discharge port 14, and thereafter, the gas generating agent in the space for the late ignition is ignited and burned to generate combustion gas and the combustion gas is discharged from the gas discharge port 14. Therefore, the combustion gas is released and the airbag is inflated such as an S-shaped output curve is obtained.

In particular, in the gas generator in accordance with the present invention, the combustion products change the flow direction by the cylindrical wall surface 71, and then flow linearly, while igniting and burning the gas generating agent present in the space for the initial ignition inside the combustion chamber 60, until the combustion products reach the space accommodating the filter 80 and communicating with the second communication portion 43. Therefore, the effect on the gas generating agent present in the space for the late ignition is small.

As a result, it is possible to set the ignition timing for the gas generating agent in the space for the late ignition against that in the space for the initial ignition.

(2) Gas Generator Depicted in FIG. 2

A gas generator 100 depicted in FIG. 2 is different from the gas generator 10 depicted in FIG. 1 in the shape of the outer cylindrical wall portion and the shape and the mounting state of the inner cylindrical wall portion. Other features, including Requirements (a) to (c) are the same and the operation is the same.

An outer cylindrical wall portion 140 has a cylindrical wall surface 141 and an inner annular flat surface 142 extending inward in the radial direction of the housing from the inner circumferential edge at the lower end (on the bottom plate 13*a* side) of the cylindrical wall surface.

In the outer cylindrical wall portion 140, the inner annular flat surface 142 is in contact with the bottom plate 13*a*, and the cylindrical wall surface 141 abuts against the lower circumferential wall portion 13*b* of the closure shell 13.

Further, because the annular step 15*a* is present, a cylindrical gas discharge path 16 communicating with the gas discharge port 14 is formed between the cylindrical wall surface 141 and the upper circumferential wall portion 12*b* of the diffuser shell 12.

The outer cylindrical wall portion 140 has the second communication portion 43 formed by a cut-out portion obtained by cutting out part of the cylindrical wall surface 141 on the top plate 12*a* side, or an opening.

An inner cylindrical wall portion 170 is disposed inside the combustion chamber 60.

The inner cylindrical wall portion 170 has a cylindrical wall surface 171 and an inner annular flat surface 172 extending inward in the radial direction of the housing from the inner circumferential edge of the cylindrical wall surface 171.

In the inner cylindrical wall portion 170, the inner annular flat surface 172 is placed on the bottom plate 13*a* and arranged in a state in which the inner circumferential edge thereof abuts against the circumferential wall 32 of the ignition device chamber housing 30.

In this case, the cylindrical wall surface 171 is disposed at a distance from the ignition device chamber housing 30 and the outer cylindrical wall portion 140, and at a distance from the annular partition wall portion 50 so that Requirements (a) to (c) are met.

The inner circumferential edge of the inner annular flat surface 172 may abut against the igniter collar 21, and the opening of the ignition device chamber housing 30 may be placed on and abutted against the inner annular flat surface 172.

Figure 3:
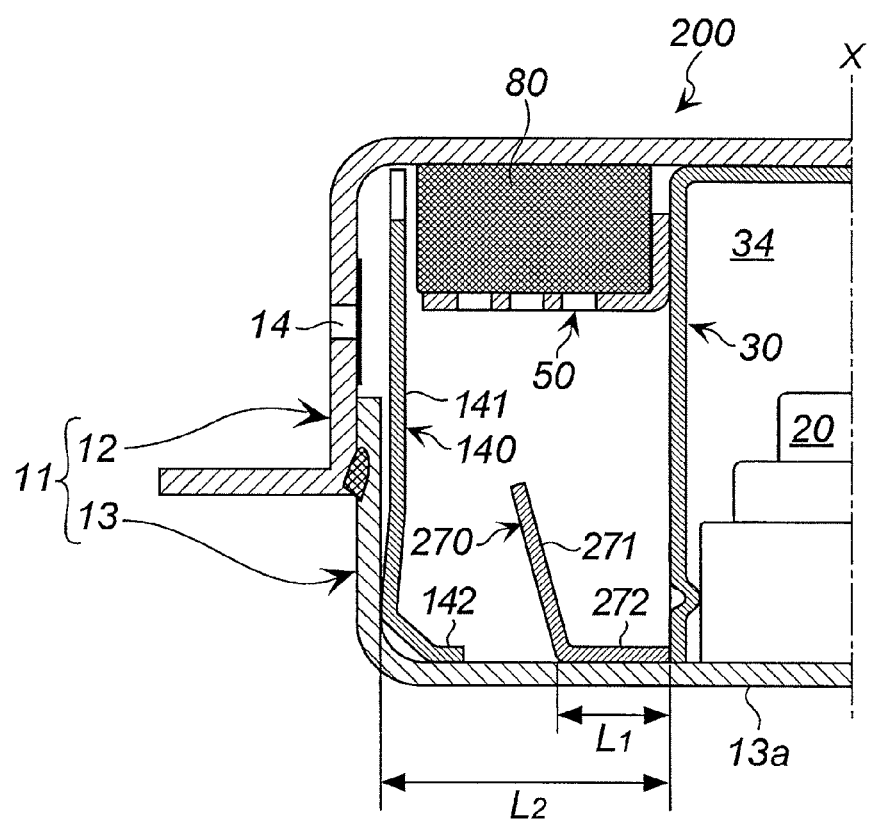
FIG. 3 shows a cross-sectional view in the X-axis direction of the housing of the gas generator which is yet another embodiment of the present invention.

(3) Gas Generator Depicted in FIG. 3

A gas generator 200 depicted in FIG. 3 is different from the gas generator 100 depicted in FIG. 2 in the shape of the inner cylindrical wall portion. Other features are the same and the operation is the same.

An inner cylindrical wall portion 270 is disposed inside the combustion chamber 60.

The inner cylindrical wall portion 270 has a cylindrical wall surface 271 and an inner annular flat surface 272 extending inward in the radial direction of the housing from the inner circumferential edge of the lower end (on the bottom plate 13*a* side) of the cylindrical wall surface 271.

In the cylindrical wall surface 271, the upper end side thereof is an inclined wall surface inclined radially outward.

The inner cylindrical wall portion 270 depicted in FIG. 3 can be integrated with the outer cylindrical wall portion, in the same way as the inner cylindrical wall portion 70 depicted in FIG. 1. In this case, in the cylindrical wall surface 271, the upper end side thereof is an inclined wall surface inclined radially inward.

In the inner cylindrical wall portion 270, the inner annular flat surface 272 is placed on the bottom plate 13*a* and arranged in a state in which the inner circumferential edge thereof abuts against the circumferential wall 32 of the ignition device chamber housing 30.

In this case, the cylindrical wall surface 271 is disposed at a distance from the ignition device chamber housing 30 and the outer cylindrical wall portion 140 and at a distance from the annular partition wall portion 50 so that Requirements (a) to (c) are met.

The inner circumferential edge of the inner annular flat surface 272 may abut against the igniter collar 21, and the opening of the ignition device chamber housing 30 may be placed on and abutted against the inner annular flat surface 272.

Requirement (a): h1/h2=0.4.

Requirement (b): L1/L2=0.5 (L1 is the length to the outer corner formed by the cylindrical wall surface 271 and the inner annular flat surface 272).

Requirement (c): the angle between the bottom plate 13*a* and the inner cylindrical wall portion 270 (the cylindrical wall surface 271) on the ignition device chamber housing 30 side is 115°.

(4) Inner Cylindrical Wall Portion (FIG. 4) that can be Used in the Gas Generators Depicted in FIG. 2 and FIG. 3

Figure 4:
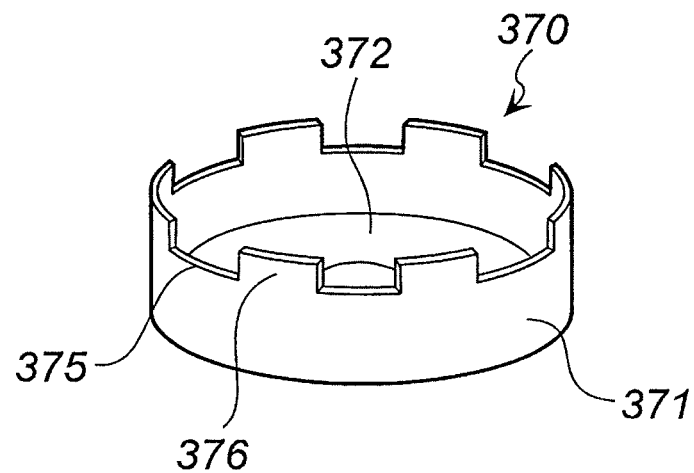
FIG. 4 shows a perspective view of the inner cylindrical wall portion that can be used in the gas generator depicted in FIG. 2 or FIG. 3.

An inner cylindrical wall portion 370 such as depicted in FIG. 4 can be used in the gas generators depicted in FIG. 2 and FIG. 3.

The inner cylindrical wall portion 370 has a cylindrical wall surface 371 and an inner annular flat surface 372 extending inward in the radial direction of the housing from the inner circumferential edge of the cylindrical wall surface 371.

In the cylindrical wall surface 371, a circumferential edge portion at the upper end thereof has depressions 375 and protrusions 376 in the X-axis direction of the housing.

The depressions 375 and the protrusions 376 are formed alternately in the circumferential direction.

In the inner cylindrical wall portion 370 depicted in FIG. 4, h1 in Requirement (a) is the height from the bottom plate 13a to the depression 375 of the cylindrical wall surface.

Further, the inner cylindrical wall portion 370 depicted in FIG. 4 can be integrated with the outer cylindrical wall portion in the same way as the inner cylindrical wall portion 70 depicted in FIG. 1.

In the inner cylindrical wall portion 370 depicted in FIG. 4, by adjusting the depth and circumferential length per depression and the number of the depressions 375, it is possible to adjust the ignition and combustion timing of the gas generating agent present in the space for the late ignition which is to be ignited after the ignition of the gas generating agent in the space for the initial ignition.

Further, the inner cylindrical wall portion 370 depicted in FIG. 4 can be provided with the inclined wall surface 271 depicted in FIG. 3.

(5) Inner Cylindrical Wall Portion (FIG. 5) of Another Embodiment that can be Used in the Gas Generators Depicted in FIG. 2 and FIG. 3

Figure 5:
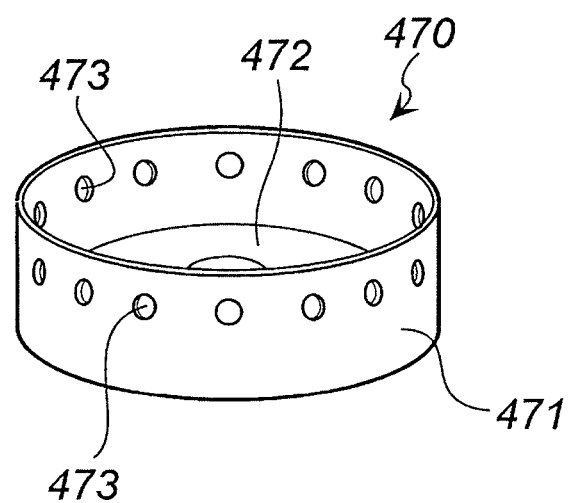
FIG. 5 shows a perspective view of the inner cylindrical wall portion of another embodiment that can be used in the gas generator depicted in FIG. 2 or FIG. 3.

An inner cylindrical wall portion 470 such as depicted in FIG. 5 can be used in the gas generators depicted in FIG. 2 and FIG. 3.

The inner cylindrical wall portion 470 has a cylindrical wall surface 471 and an inner annular flat surface 472 extending inward in the radial direction of the housing from the inner circumferential edge of the cylindrical wall surface 471.

The cylindrical wall surface 471 has a plurality of through holes 473 in the thickness direction in the circumferential wall thereof.

The through holes 473 are formed at the same height equidistantly in the circumferential direction.

In the inner cylindrical wall portion 470 depicted in FIG. 5, h1 in Requirement (a) is the height from the bottom plate 13a to the circumferential edge at a lower end of the through hole 473.

Further, the inner cylindrical wall portion 470 depicted in FIG. 5 can be integrated with the outer cylindrical wall portion in the same way as the inner cylindrical wall portion 70 depicted in FIG. 1.

In the inner cylindrical wall portion 470 depicted in FIG. 5, by adjusting the size per hole, the number and the height of the through holes 473, it is possible to adjust the ignition and combustion timing of the gas generating agent present in the space for the late ignition which is to be ignited after the ignition of the gas generating agent in the space for the initial ignition.

Further, the inner cylindrical wall portion 470 depicted in FIG. 5 can be provided with the inclined wall surface 271 depicted in FIG. 3.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator for a restraining device, comprising:
a housing including a top plate, a circumferential wall provided with a gas discharge port and a bottom plate;
a tubular ignition device chamber housing being disposed inside the housing to form an ignition device chamber, that accommodates an ignition device, and having one end opening closed;
an outer cylindrical wall portion being disposed such that a gas discharge path in communication with the gas discharge port is formed between the circumferential wall and the outer cylindrical wall portion;
an annular partition wall portion having a gas-flow hole and being disposed between the ignition device chamber housing and the outer cylindrical wall portion to form a space with the top plate;
a combustion chamber enclosed by the top plate, the bottom plate, the ignition device chamber housing, and the outer cylindrical wall portion and being charged with a gas generating agent therein;
an inner cylindrical wall portion arranged on the bottom plate and spaced from the ignition device chamber housing and the outer cylindrical wall portion, and also at a distance from the annular partition wall portion;
the ignition device chamber and the combustion chamber communicating with each other by a first communication portion formed by an opening provided in a circumferential wall portion of the ignition device chamber housing on the bottom plate side;
the combustion chamber and the space formed by the annular partition wall portion communicating with each other by the gas-flow hole of the annular partition wall portion;
the space formed by the annular partition wall portion and the gas discharge path which communicates with the gas discharge port, communicating with each other by a second communication portion formed by an opening provided between the outer cylindrical wall portion and the top plate;
the first communication portion and the inner cylindrical wall portion facing each other in a radial direction of the housing; and
a combustion product, which is generated in the ignition device chamber, passing through the first communication portion, then colliding with the inner cylindrical wall portion, changing a flow direction toward the top plate where the second communication portion is provided, and passing through the gas-flow hole of the annular partition wall portion.

2. The gas generator for a restraining device according to claim 1, wherein
the inner cylindrical wall portion meets at least Requirement (a) among requirements selected from following Requirements (a) to (c); and
Requirement (a) is met by that a ratio (h1/h2) of a height (h1) from the bottom plate to the upper end of the inner cylindrical wall portion and a height (h2) from the bottom plate to the annular partition wall portion is within a range of 0.3 to 0.7;
(a) a height range of the inner cylindrical wall portion in the axial direction of the housing from the bottom plate is adjusted;
(b) a distance between the inner cylindrical wall portion and the ignition device chamber housing is adjusted; and
(c) an inclination angle of the inner cylindrical wall portion with respect to the bottom plate is adjusted.

3. The gas generator for a restraining device according to claim 2, wherein
Requirement (b) is met by that a ratio (L1/L2) of a distance (L1) from the ignition device chamber housing to the inner cylindrical wall portion to a distance (L2) from the ignition device chamber housing to the outer cylindrical wall portion is within a range of 0.1 to 0.9, and
Requirement (c) is met by that an angle between the bottom plate and the inner cylindrical wall portion on a side of the ignition device chamber housing is 70° to 140°.

4. The gas generator for a restraining device according to claim 1, wherein
the height, from the bottom plate, of the upper end of the opening forming the first communication portion is equal to or less than half of the height (h1) from the bottom plate to the upper end of the inner cylindrical wall portion.

5. The gas generator for a restraining device according to claim 1, wherein
the inner cylindrical wall portion has a cylindrical wall surface and an outer annular flat surface extending outward in the radial direction of the housing from an outer circumferential edge at a lower end of the cylindrical wall surface;
the outer cylindrical wall portion has a cylindrical wall surface and an inner annular flat surface extending inward in the radial direction of the housing from an inner circumferential edge at a lower end of the cylindrical wall surface;
the inner cylindrical wall portion and the outer cylindrical wall portion is formed integrally at the outer annular flat surface and the inner annular flat surface; and
an outer circumferential surface of the cylindrical wall surface of the outer cylindrical wall portion is fitted in a state of abutment against a circumferential wall of the housing where the gas discharge port is not formed.

6. The gas generator for a restraining device according to claim 1, wherein
the inner cylindrical wall portion has a cylindrical wall surface and an inner annular flat surface extending inward in the radial direction of the housing from an inner circumferential edge at a lower end of the cylindrical wall surface; and
an inner circumferential edge of the inner annular flat surface of the inner cylindrical wall portion is fitted in a state of abutment against the ignition device or the ignition device chamber housing.

7. The gas generator for a restraining device according to claim 1, wherein
the inner cylindrical wall portion has a cylindrical inclined wall surface inclined outward in the radial direction of the housing and an inner annular flat surface extending inward in the radial direction of the housing from an inner circumferential edge at a lower end of the inclined wall surface; and
an inner circumferential edge of the inner annular flat surface of the inner cylindrical wall portion is fitted in a state of abutment against the ignition device or the ignition device chamber housing.

8. The gas generator for a restraining device according to claim 2, wherein
the inner cylindrical wall portion has a cylindrical wall surface and an outer annular flat surface extending outward in the radial direction of the housing from an outer circumferential edge at a lower end of the cylindrical wall surface;
a circumferential edge portion at the upper end of the cylindrical wall surface has depression and protrusion in the axial direction of the housing, the depression and protrusion are formed in a plurality of locations in the circumferential direction, and h1 in Requirement (a) is a height from the bottom plate to the depression of the cylindrical wall surface;
the outer cylindrical wall portion has a cylindrical wall surface and an inner annular flat surface extending inward in the radial direction of the housing from an inner circumferential edge of the cylindrical wall surface;
the inner cylindrical wall portion and the outer cylindrical wall portion are formed integrally at the outer annular flat surface and the inner annular flat surface; and
an outer circumferential surface of the cylindrical wall surface of the outer cylindrical wall portion is fitted in a state of abutment against a circumferential wall of the housing where the gas discharge port is not formed.

9. The gas generator for a restraining device according to claim 2, wherein
the inner cylindrical wall portion has a cylindrical wall surface and an inner annular flat surface extending inward in the radial direction of the housing from an inner circumferential edge at a lower end of the cylindrical wall surface;
a circumferential edge portion at the upper end of the cylindrical wall surface has depression and protrusion in the axial direction of the housing, and the depression and protrusion are formed in a plurality of locations in the circumferential direction;
h1 in Requirement (a) is a height from the bottom plate to the depression of the cylindrical wall surface;
an inner circumferential edge of the inner annular flat surface of the inner cylindrical wall portion is fitted in a state of abutment against the ignition device or the ignition device chamber housing.

10. The gas generator for a restraining device according to claim 2, wherein
a plurality of through holes are formed in the circumferential direction in the cylindrical wall surface of the inner cylindrical wall portion; and
h1 in Requirement (a) is a height from the bottom plate to a lower end circumferential edge of the through hole.

11. The gas generator for a restraining device according to claim 1, wherein an annular filter is disposed in the space between the top plate and the annular partition wall portion having the gas-flow hole.

* * * * *